United States Patent [19]

Moffat

[11] 4,454,099

[45] Jun. 12, 1984

[54] SORBENT BASES TREATED WITH ORGANIC HALIDES AND THEIR USE TO REMOVE ACIDIC SUBSTANCES FROM GAS MIXTURES

[75] Inventor: Arlo J. Moffat, Dewey, Okla.

[73] Assignee: Phillips Petroleum Company, Bartlesville, Okla.

[21] Appl. No.: 375,528

[22] Filed: May 6, 1982

[51] Int. Cl.³ .................. B01D 53/34; C09K 3/00
[52] U.S. Cl. .................. 423/210; 423/230; 423/240; 423/239; 423/243; 423/244; 252/190; 252/192; 502/152; 502/401
[58] Field of Search .............. 423/210, 230, 240, 243, 423/244 R, 239, 244 A; 55/73, 74, 387; 252/190, 192, 430, 441, 475, 476; 502/152, 401

[56] References Cited

U.S. PATENT DOCUMENTS

| | | |
|---|---|---|
| 1,469,959 | 10/1923 | Richter et al. |
| 3,505,008 | 4/1970 | Frevel et al. ............ 423/244 |
| 3,589,863 | 6/1971 | Frevel et al. ............ 423/244 |
| 3,785,119 | 1/1974 | Mellvaine ................ 55/7 |
| 3,860,402 | 1/1975 | Strom et al. ............. 55/90 |
| 3,925,021 | 12/1975 | Yoshino et al. ........... 23/252 R |
| 4,115,518 | 9/1978 | Delman et al. ........... 423/244 |

OTHER PUBLICATIONS

Chemie Ingenieur Technik, vol. 48, Issue No. 10, Oct. 1976, pp. 863–865.

*Primary Examiner*—Earl C. Thomas

[57] ABSTRACT

One or more sorbent bases selected from the group consisting of the alkali and alkaline earth metal oxides, hydoxides, carbonates and bicarbonates are treated with at least one organic halide of the general formula $R-X_n$ where R is an organic radical containing from 1 to about 12 carbon atoms, X is a halogen atom and n has a value from 1 to about 10 to form a sorbent suitable for removing acidic substances from gas mixtures.

15 Claims, No Drawings

SORBENT BASES TREATED WITH ORGANIC HALIDES AND THEIR USE TO REMOVE ACIDIC SUBSTANCES FROM GAS MIXTURES

BACKGROUND

The removal of gaseous pollutants, such as sulfur dioxide, from gas mixtures in an economical and efficient manner has obvious environmental desirability.

Prior art removal schemes employing solid scavengers for gas purification were expensive because the sorbents or scavengers had limited sorptive capacity and high temperatures were employed during the removal operation.

THE INVENTION

The invention rests on the discovery that the efficiency of solid absorbents is improved by pretreating them with certain organic compounds. The treated sorbents are 2 to 3 times as efficient as untreated absorbents for removing sulfur dioxide from gases. The treated sorbents can be used at moderate temperatures, so that energy is saved.

OBJECTS OF THE INVENTION

It is one object of the invention to enhance the efficiency of adsorbents for gaseous pollutants.

Another object of the invention is to improve the adsorptive capacity of a sorbent base by treating it with an organic halide treating agent.

It is still another object of the invention to improve the efficiency of sulfur dioxide absorbents by pre-treating with organic halides.

A further object of the invention is the production of a pretreated sorbent for noxious gases, which sorbent may be used at temperatures which are significantly lower than the temperatures at which conventional sorbents are used.

DESCRIPTION OF THE INVENTION

The invention deals with the preparation and use of a sorbent material. In a preferred embodiment, the preparation comprises the steps of saturating a carrier with an organic halide and contacting the carrier/organic halide combination with a sorbent base.

The use of the treated sorbent comprises the steps of contacting a pollutant-containing gas therewith in a suitable contacting zone and removing the essentially pollutant-free gas therefrom.

The gases to be treated in accordance with the invention include exhausts, flue gases, and other gaseous mixtures which contain appreciable levels of toxic or polluting substances. Among the pollutants which the treated sorbents of the invention will substantially remove are acidic substances such as sulfides, oxides of sulfur, oxides of nitrogen, and hydrogen halides. Thus the invention is effective for removing $NO$, $NO_2$, $SO_2$, and $SO_3$. It is particularly effective for removing $SO_2$.

The sorbent base employed herein is an inorganic solid. One useful group of bases are the carbonates and bicarbonates of metals. Preferably, one or more alkali and alkaline earth metal oxides, hydroxides, carbonates and bicarbonates are employed. Naturally-occurring carbonates and bicarbonates, such as nahcolite (native $NaHCO_3$), trona ($Na_2CO_3 \cdot NaHCO_3 \cdot 2H_2O$) and dolomite [$CaMg(CO_3)_2$] are useful. $CaCO_3$ (limestone) is highly preferred.

Optionally, metal bicarbonates can be completely or partially converted to carbonates by conventional techniques, e.g. by heating, and then used as bases herein. Suitable temperatures for this heat conversion lie between about 15° and 80° C.

The sorbent base is prepared for use by contacting it with one or more organic halide treating agents in the presence or absence of a carrier. The organic halides employed conform to the general formula

$$R-X_n$$

wherein R is an organic radical containing from one to about 12 carbon atoms, X is a halogen atom, and n has a value of from 1 to about 10. R can be aromatic, aliphatic, or cycloaliphatic. It can contain one or more aromatic moities as well as one or more ethylenically unsaturated moities. A preferred group of organic halides are olefinic halides containing two to ten carbon atoms and one to four halogen atoms.

X may be any halogen which permits the compound to have adequate heat stability and affinity for the sorbent base used in the invention. Chlorides are preferred. Ethylene chloride is highly preferred treating agent.

When employed, the carriers usually contain one or more inert gases such as nitrogen, argon, helium, xenon, krypton, carbon dioxide, and neon with or without oxygen. Preferably, the carrier employed is helium plus 5% oxygen.

The carrier is saturated with the organic halide via conventional techniques. Among the useful techniques are bubbling carrier gas through organic halide.

The resultant carrier/organic halide compositions will generally contain between 1 ppm and 100 wt. % organic halide. The use of excess halide is undesirable because too much halide can cause corrosion problems.

Once saturated with organic halide, the carrier is contacted with the sorbent base. Under suitable conditions, the sorbent is saturated with the organic halide while in contact therewith. Preliminary treatment of the base is not required, but may be employed if desired. The treating process can be a "rejuvenation" process in that the base is one which has been employed in a previous pollutant removal operation.

The contacting of the base with the carrier/organic halide composition takes place at a temperature lying within the range of 25° C. to the halide decomposition temperature. Preferably, temperatures between 25° and 500° C. are employed, with 300° C. most preferred.

The length of time required to treat the sorbent varies from 1 to 100 minutes. Preferred contacting times are between 1 to 15 minutes.

Techniques for contacting the sorbent base with the carrier/organic halide composition include fluidizing sorbent base with carrier base.

After treatment with the organic halide or organic halide/carrier composition, the sorbent is ready for use. Typical removal operations employing the instant pretreatment are carried out at temperatures of 400° to 800° C. Applicant's sorbents are useful at temperatures of 200° to 600° C., resulting in an energy saving for many removal operations.

EXAMPLE 300 mL of helium plus 5% oxygen was saturated at 0° with ethylene chloride for 2 to 5 minutes.

0.1 gram of the mixture produced above was contacted at 300° C. with 0.4 gram of $NaHCO_3$.

It was found that treated sodium bicarbonates such as that produced above are 2 to 10 times faster in the removal of sulfur dioxide from noxious gas than untreated sodium bicarbonates.

Reasonable variations can be made in carrying out this invention without departing from the scope thereof.

I claim:

1. A process of producing a sorbent material useful for the removal of one or more noxious acidic-substances from gas mixtures comprising the step of pretreating one or more sorbent bases selected from the group consisting of alkali and alkaline earth metal oxides, hydroxides, carbonates and bicarbonates with at least one organic halide of the general formula:

$$R-X_n$$

wherein R is an organic radical containing from 1 to about 12 carbon atoms, X is a halogen atom, and n has a value of from 1 to about 10, and wherein said pretreatment is conducted under conditions sufficient to saturate said base or bases with organic halide.

2. The process of claim 1 wherein the organic halide is mixed with a carrier gas before it is contacted with the sorbent base.

3. The process of any one of claims 1 or 2 wherein the organic halide employed is an olefinic chloride.

4. The process of claim 3 wherein the organic halide is ethylene chloride.

5. The process of claim 4 wherein the sorbent base is sodium carbonate.

6. The sorbent produced by the process of any one of claims 1 or 2.

7. The sorbent produced by the process of claim 3.

8. The sorbent produced by the process of claim 4.

9. A sorbent useful for removing sulfur dioxide from gases comprising a particulate metal carbonate or bicarbonate which has been contacted with an organic halide under conditions sufficient to saturate it with organic halide.

10. The sorbent material of claim 9 wherein particulate sodium bicarbonate has been contacted with ethylene chloride.

11. A process of removing one or more noxious acidic substances from a gas comprising, contacting the gas with a pretreated sorbent which sorbent is produced by treating a sorbent base selected from the group consisting of alkali and alkaline earth metal oxides, hydroxides, carbonates, and bicarbonates with a treating agent comprising one or more organic halides under conditions sufficient to saturate said sorbent base with organic halide.

12. The process of claim 11 wherein the organic halide is at least one compound of the formula $$R-X_n$$

wherein R is an organic radical containing from 1 to about 12 carbon atoms, X is a halogen atom, and n has a value of 1 to about 10.

13. The process of claim 12 wherein the organic halide is ethylene chloride.

14. The process according to any one of claims 11, 12, or 13 wherein the contacting of the gas and the pretreated sorbent takes place at temperatures between 25° and 500° C.

15. The process of claim 1 wherein the acidic substances to be removed are selected from the group consisting of the sulfides and oxides of sulfur and nitrogen, the hydrogen halides, and mixtures thereof.

* * * * *